Aug. 13, 1940.　　　K. BRENKERT　　　2,211,364
MOTION PICTURE PROJECTOR
Filed Nov. 21, 1938　　　2 Sheets-Sheet 2

INVENTOR.
Karl Brenkert
BY Samuel Wereman
ATTORNEY.

Patented Aug. 13, 1940

2,211,364

UNITED STATES PATENT OFFICE 2,211,364

MOTION PICTURE PROJECTOR

Karl Brenkert, Detroit, Mich., assignor to Brenkert Light Projection Company, Detroit, Mich., a corporation of Michigan Application November 21, 1938, Serial No. 241,541

7 Claims. (Cl. 184—6)

The present invention pertains to the solution of certain problems in the lubrication of motion picture projectors, and more particularly with respect to automatic lubrication. One of the methods now in use involves a manual pressure device from which lubricant is delivered through pipe lines to various points. Such a system cannot operate satisfactorily by the mere substitution of an automatic pressure device driven from the projector motor, for the reason that some of the lines are of rather large diameter and the volume of lubricant forced therethrough would place too great a load on the standard ⅙ to ¼ horse power motor of the projector. Pipe lines of smaller internal diameter would be objectionable because they easily become clogged, with the result that inadequate lubrication of even one bearing is liable to halt the operation of the machine. In the same connection, the cold oil during initial operation of the machine flows slowly through small lines, with similar results.

Another objection to individual lines, whether large or small, is that they interfere with accessibility to various parts of the mechanism, especially since the mechanism can be reached at all only through one side of the projector housing.

The object of this invention is to provide an automatic lubricating system operating from the standard projector motor without undue load thereon and not subject to the above mentioned difficulties in connection with motion picture projectors. The invention operates on the principle of throwing a spray of oil in the mechanism chamber of the machine to cover the various moving parts contained therein. In this connection, another object of the invention is to confine the spray to the general area occupied by the moving parts rather than permit it to spread to places where it is not needed.

These objects are accomplished by forcing the lubricant to a reservoir above the mechanism and permitting it to drain against a rapidly rotating member that disperses the lubricant. The latter member is in the nature of a cup having peripheral ports. The direction of the port determines the direction or directions in which the lubricant is thrown and thus constitutes a control for concentrating the lubrication to the areas where it is actually needed.

The shape and location of the distributor cup are such that it does not interfere with the accessibility to parts of the mechanism for purposes of cleaning, adjustment or repair from time to time. The ports in the cup are normally kept open by the centrifugal force of the lubricant thrown through them, but no damage is done if one or a few of the ports become clogged, since the lubricant issuing from the remaining ports is distributed over the entire lubrication area.

The system operates effectively and satisfactorily regardless of the angle to which the projector is tilted, which angle may range from 10 degrees below to 38 or more degrees above the horizontal. The operation of the system is made independent of the angle of tilting by reason of the fact that the lubricant is picked up by a pump having its intake at the lower forward corner of the projector housing, and this pump delivers the lubricant to the distributor. Finally, the operation of the pump and the distributor impose no undue load on the standard projector motor, notwithstanding that these parts are geared to the projector mechanism.

The invention is fully disclosed by way of example in the following description and the accompanying drawings, in which.

Reference to these views will now be made by use of like characters that are employed to designate corresponding parts throughout.

Figure 1:
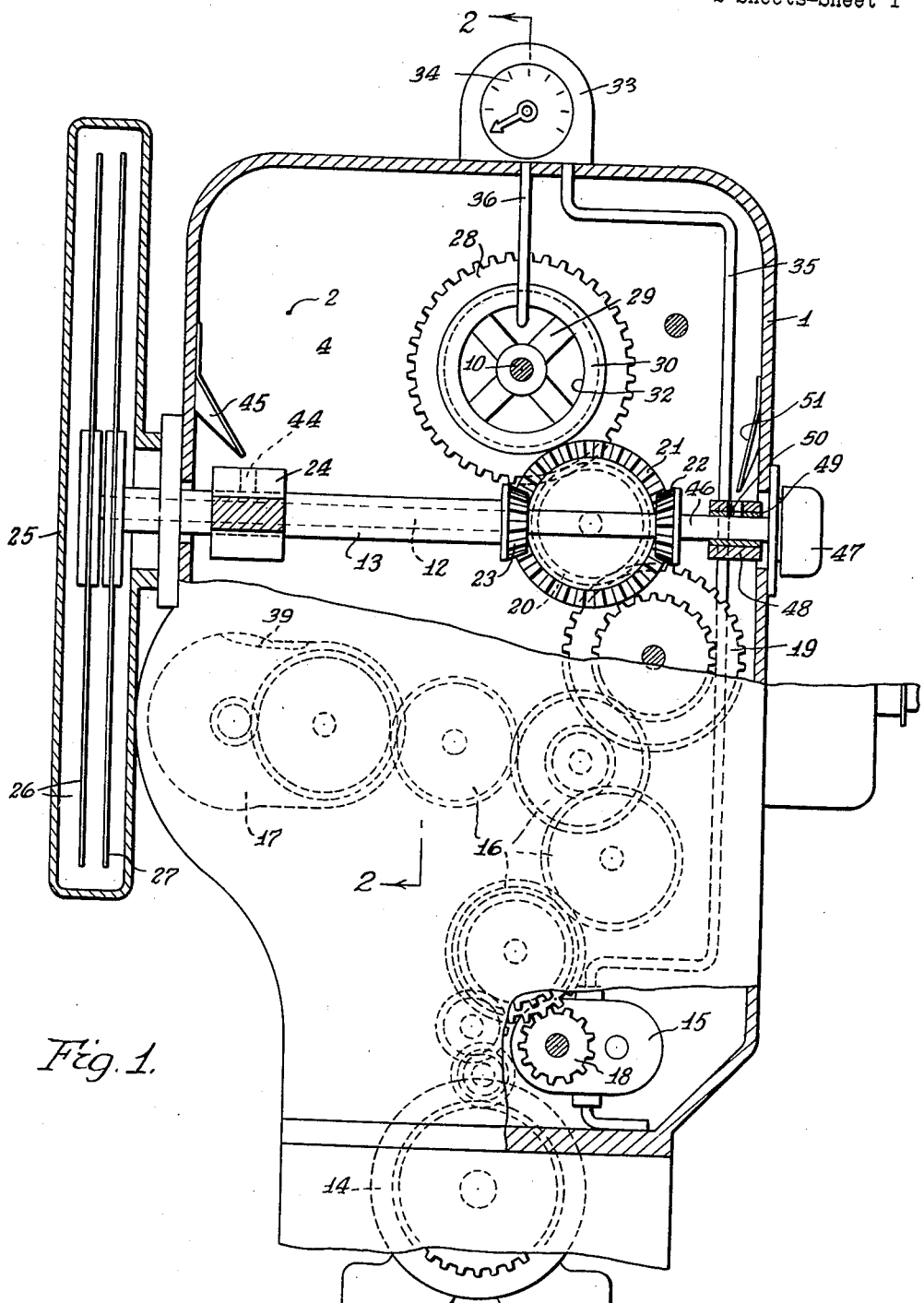
Figure 1 is a vertical section, partly in elevation of a motion picture projector, illustrating the gear trains and the lubricating apparatus.
Figure 2:
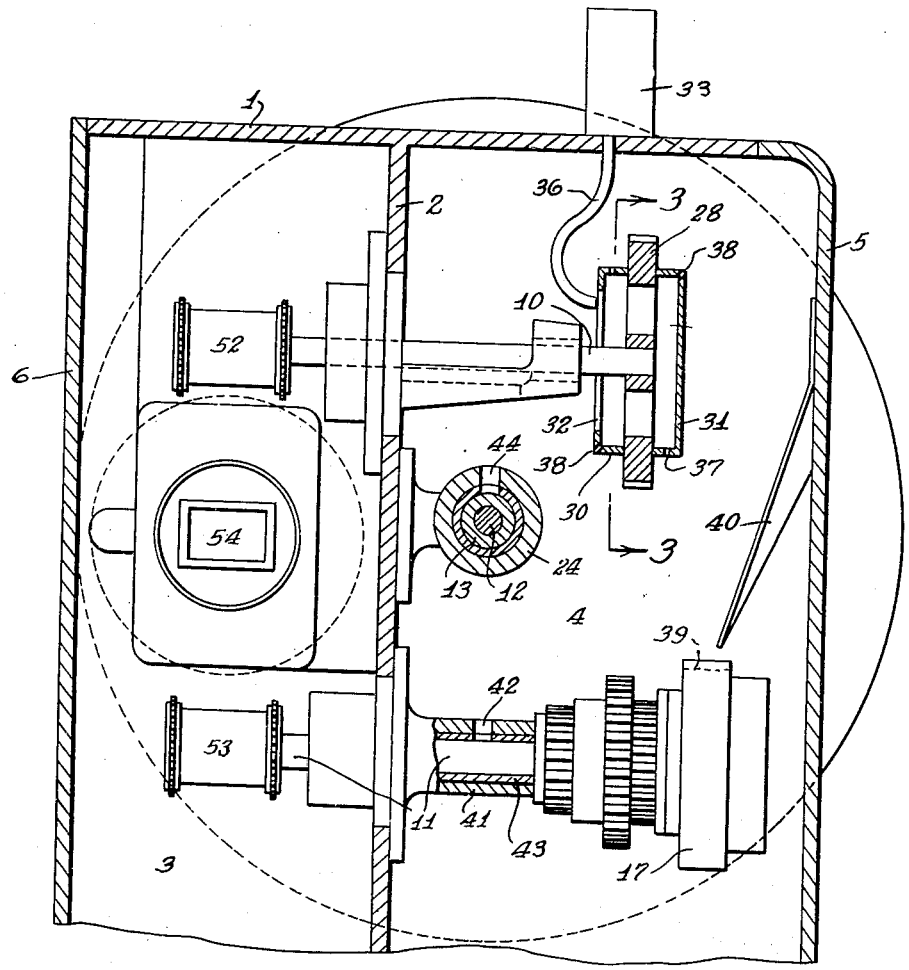
Figure 2 is a section on the line 2—2 of Figure 1.

In Figures 1 and 2 the projector housing 1 is illustrated in a vertical plane parallel to the shutter shaft. The interior of the housing is divided by a vertical partition 2 into a film compartment 3 and a mechanism compartment 4. These compartments are fluid tight with respect to each other so that the film compartment does not receive any of the lubricant from the mechanism compartment, thereby obviating the usual necessity of wiping the film. The outer side wall 5 of the mechanism compartment is necessarily a separate member to permit assembly of the mechanism and is subsequently hermetically sealed to the body of the housing. The outer side wall 6 of the film compartment is in form of a door to permit access to the interior of the compartment.

The operating mechanism in the compartment 4 may be regarded as conventional, insofar as this invention is concerned, except as modified for the purpose of lubrication.

The mechanism compartment 4 contains three principal shafts, the remaining shafts being provided merely for the purpose of carrying the connecting gears or for the operation of accessory devices. The principal shafts are the upper sprocket shaft 10, the lower sprocket or intermittent shaft 11, both of which are perpendicular to and extend through the partition 2, and the shutter shafts, 12 and 13 perpendicular to the first named shafts and extending through the housing as illustrated in Figure 1.

At the base of the housing is a drive motor 14. In the bottom of the housing is a gear pump comprising a casing 15 and containing the usual meshing gears (not shown).

A train of gearing 16 is provided between the motor 14 and the intermittent mechanism built around the shaft 11. This gearing, as well as other gearing presently to be described, is designed for transmission of power and proper speed reduction. The intermittent mechanism operating on the shaft 11 is enclosed in a casing 17. The train 16 also connects with a driving gear 18 on the outside of the pump casing 15 and co-axial with one of the gears therein.

The train 16 is extended at 19 to mesh with spur teeth 20 on one side of a shutter actuating gear, the other side of which has bevel teeth 21. The shaft 12 lies within the shaft 13, both being properly journaled and carrying bevel pinions 22 and 23 respectively meshing with the bevel gear 20 at diametrically opposite points.

The shafts 12 and 13 extend through a bearing 24 and into a shutter housing 25 exterior of the main housing 1. Within the housing 25, the shafts 12 and 13 carry shutter blades 26 and 27 that rotate in opposite directions across a shutter opening (not shown).

The gear teeth 20 mesh with a gear 28 on the upper sprocket shaft 10, whereby the latter is actuated. The gear 28 may be further utilized to drive other mechanism such as the usual governor and fire shutter as well as a ventilating fan, as disclosed in my copending applications.

The gear 28 is cored from side to side, as by the provision of spokes 29. On opposite faces of the gear are mounted cups 30 and 31, as shown more clearly in Figure 2. The cup 30 on the shaft side has an opening 32 to accommodate the shaft and to admit lubricant as will presently appear.

On the top of the housing 1, directly over the gear 28, is an oil reservoir 33 containing an oil gauge 34. The reservoir preferably contains a filter screen as shown in my copending application, Serial No. 232,813, filed October 1, 1938. An oil supply pipe 35 extends from the outlet side of the pump 15 into the reservoir, and from the reservoir extends an outlet or drip pipe 36 to the opening 32 for the purpose of delivering lubricant to the cups 30 and 31. The pipes 35 and 36 extend from opposite sides of the filter screen in the reservoir 33.

The cups 30 and 31 are formed with ports in the peripheral wall to discharge by centrifugal force the lubricant admitted through the pipe 36. It will be evident that the lubricant first enters the cup 30 and passes therefrom between the spokes 29 to the cup 31. The direction in which the lubricant is to be discharged is pre-determined by the location of the ports and their angular relation to the axis of rotation. For example, each cup may be formed with a series of ports 37 that are strictly radial or perpendicular to the axis and another series 38 radial and angular to the axis of rotation. By proper location of the ports, the lubricant is directed to the desired area in a more concentrated condition than elsewhere.

It is desired that the intermittent mechanism within the casing 17 operate in a bath of oil. Therefore, the top of the casing 17 is fitted with a screen 39 in its top to which extends a spout or baffle 40 secured to the wall 5. This member collects some of the sprayed lubricant and directs it to the screen 39.

To lubricate the shaft 11, the fixed bearing 41 thereof is formed with a port 42 registering with a similarly ported bushing 43 between the shaft 11 and bearing. Some of the lubricant discharged from the cups is obviously collected in the ports 42 and bushing 43. A similar construction may be provided at other shafts as illustrated in Figure 2 in connection with the shaft 12. The bearing 24 is also ported at 44 and fed with oil from a spout or baffle 45 secured to the adjacent wall of the housing and directed towards the port.

The shaft 12 is extended at 46 through the forward wall of the housing 1 and provided with a knob 47 for hand adjustment. The extension 46 is supported in a bearing 48 lined with a bushing 49, both of which are ported at 50. Lubricant is directed to the ports by a baffle 51 secured to the forward wall of the housing as shown in Figure 1.

The shafts 10 and 11 are extended through the partition 2 into the compartment 3 and are there provided with the usual film feed sprockets 52 and 53 respectively. Between the sprockets is the usual gate 54.

It will now be evident that the invention provides a lubricating system of the character described that is comparatively simple in manufacture and thoroughly effective in operation. The construction herein described does away with individual piping to the parts to be lubricated and likewise eliminates the possible clogging of such piping with the resulting serious damage to the machine from this cause. The sprayed lubricant, although widely scattered, is nevertheless confined generally to pre-determined paths by the arrangement of discharge ports in the cups 30 and 31.

The interior of the cup is lined at all times with lubricant covering all the ports. Consequently, the peripheral series of ports are supplied with lubricant at all times during the operation of the device. No serious damage to the mechanism can occur even if some of the discharge ports are obstructed, since the remaining ports deliver lubricant over the entire lubrication area. The lubricant is discharged around a complete circle of 360°, as distinguished from a more or less tangential discharge or spray as in the case of other types of rotary distributors.

Because of the location of the intake of the pump 15 in the forward corner of the housing and the circular discharge previously mentioned, the system is effective regardless of the tilting of the projector within the usual limits. It will also be seen that the system does not obstruct access to any part of the mechanism and further require no additional source of power.

The lubricant delivered from the pipe 36 is preferably under the pressure of three or four pounds in order to force the lubricant through the gear 28 into the cup 31.

Figures 3, 4:
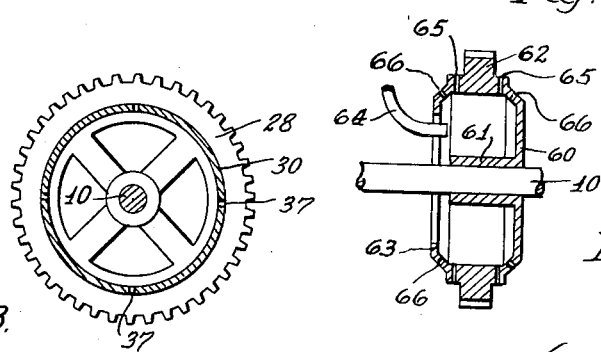
Figure 3 is a section on the line 3—3 of Figure 2.
Figure 4 is a sectional view of a modification.

In the modification shown in Figure 4 the lubricant discharging vessel is formed integral with the gear to avoid any obstruction to the entering lubricant and also to do away with the need for supplying the entering lubricant under pressure, if so desired. Accordingly, there is provided a cup 60 having a hub 61 by means of which it is secured on the shaft 10. Around the cup is formed or secured a ring gear 62 driven in the manner previously described. At the other side of the gear is an inwardly extending flange structure 63 constituting the second cup but spaced around the hub 61 to permit insertion of the lubricant delivery pipe 64. The cup 61 and the member 63 are each formed with appropriate ports 65 and 66 in substantially the manner previously described. Since there is no obstruction within the structure, pressure on the oil supply is not essential.

Either of the devices herein described furnishes uniform as well as a controlled supply of oil to the various parts because of the arrangement of the ports and the constant lining of lubricant within the distributing vessel or vessels. There is no superfluous discharge of lubricant to the lubrication areas or to areas requiring no lubrication, so that the load necessary to distribute the lubricant can be reduced substantially to the actual useful requirement and can be carried satisfactorily by the usual projector motor.

Although specific embodiments have been illustrated and described, it will be understood that various alterations in the details of construction may be made without departing from the scope of the invention, as indicated by the appended claims.

What I claim is:

1. In a motion picture projector, a housing, operating mechanism therein, a shaft therein, a gear on said shaft, a lubricant vessel rotatable with said gear and shaft, means for delivering lubricant to said vessel, said vessel having discharge ports disposed laterally of the gear teeth and extending outwardly with respect to its axis of rotation.

2. In a motion picture projector, a housing, operating mechanism therein, a gear rotatably mounted in said housing, a lubricant vessel carried by said gear, means for rotating said gear, means for delivering lubricant to said vessel, said vessel having discharge ports disposed laterally of the gear teeth and extending outwardly with respect to its axis of rotation.

3. In a motion picture projector, a housing, operating mechanism therein, a gear rotatably mounted in said housing, lubricant vessels carried by said gear at opposite faces thereof, means for rotating said gear, means for delivering lubricant to said vessels, said vessels having discharge ports disposed laterally of the gear teeth and extending outwardly with respect to its axis of rotation.

4. In a motion picture projector, a housing, operating mechanism therein, a gear rotatably mounted in said housing, lubricant vessels carried by said gear at opposite faces thereof, means for rotating said gear, said gear having a passage therethrough connecting said vessels, means for delivering lubricant to one of said vessels, said vessels having discharge ports disposed laterally of the gear teeth and extending outwardly with respect to its axis of rotation.

5. In a motion picture projector, a housing, operating mechanism therein, a shaft therein, a gear on said shaft, a lubricant vessel rotatable with said gear and shaft, and continuous supply means for delivering lubricant to said vessel, said vessel having discharge ports disposed laterally of the gear teeth extending outwardly with respect to its axis of rotation.

6. In a motion picture projector, a housing, operating mechanism therein, a shaft therein, a gear on said shaft, a lubricant vessel rotatable with said gear and shaft, means for delivering lubricant to said vessel, said vessel having discharge ports disposed laterally of the gear teeth and positioned to throw lubricant to areas spaced lengthwise with respect to the axis of rotation of the vessel.

7. In a motion picture projector, a housing, operating mechanism therein, a shaft therein, a gear on said shaft, a lubricant vessel rotatable with said gear and shaft, means for delivering lubricant to said vessel, said vessel having discharge ports disposed laterally of the gear teeth and extending outwardly with respect to its axis of rotation, and baffles mounted at parts of said operating mechanism and positioned to receive lubricant and direct it to said parts.

KARL BRENKERT.